ically unsaturated hydrocarbon groups per molecule and a platinum catalyst into a desired form and contacting the shaped form with an organohydrogenpolysiloxane in a liquid form so that the latter siloxane diffuses through the shaped body and pertains to the crosslinking reaction with the unsaturated groups in the former siloxane as catalyzed by the platinum catalyst to give a cured silicone rubber body.

United States Patent [19]

Fukuda et al.

[11] Patent Number: 4,528,156
[45] Date of Patent: Jul. 9, 1985

[54] METHOD FOR THE PREPARATION OF A SHAPED ARTICLE OF CURED SILICONE RUBBER

[75] Inventors: Takeshi Fukuda; Satoshi Yumoto, both of Gunma, Japan

[73] Assignee: Shin-Etsu Chemical Co., Ltd., Tokyo, Japan

[21] Appl. No.: 536,367

[22] Filed: Sep. 27, 1983

[30] Foreign Application Priority Data

Sep. 30, 1982 [JP] Japan ............................. 57-171188

[51] Int. Cl.³ .............................................. B29C 25/00
[52] U.S. Cl. .................................. 264/236; 264/209.6; 264/331.11; 264/340; 264/347; 524/266; 528/15
[58] Field of Search .................. 264/236, 347, 331.11, 264/340, 225, 209.6; 528/15; 524/266

[56] References Cited

U.S. PATENT DOCUMENTS

| | | | |
|---|---|---|---|
| 3,198,868 | 8/1965 | Pedretti et al. | 264/347 |
| 3,781,400 | 12/1973 | Couchoud et al. | 264/236 |
| 3,989,790 | 11/1976 | Bruner et al. | 264/225 |
| 4,061,704 | 12/1977 | Barter | 264/347 |
| 4,100,240 | 7/1978 | Bassani | 264/209.6 |
| 4,138,462 | 2/1979 | Procida et al. | 264/347 |
| 4,337,332 | 6/1982 | Melancon et al. | 264/331.11 |
| 4,340,709 | 7/1982 | Jeram et al. | 264/331.11 |
| 4,371,682 | 2/1983 | Hashimoto | 264/331.11 |
| 4,401,498 | 8/1983 | Jahn et al. | 264/347 |

FOREIGN PATENT DOCUMENTS

| | | | |
|---|---|---|---|
| 2448861 | 4/1975 | Fed. Rep. of Germany | 264/236 |
| 58104734 | 6/1981 | Japan | 264/347 |

*Primary Examiner*—Jeffery Thurlow
*Attorney, Agent, or Firm*—Toren, McGeady, Stanger, Goldberg & Kiel

[57] ABSTRACT

The invention provides a method for the preparation of a cured silicone rubber body by curing at room temperature and yet free from the problems of the low shape-retainability before curing of the conventional room temperature-vulcanizable silicone rubber compositions and the relatively poor mechanical strengths of the cured bodies thereof due to the use of relatively low molecular weight components therein. The method comprises shaping an organopolysiloxane composition comprising an organopolysiloxane of a sufficiently high molecular weight having at least two aliphatically unsaturated hydrocarbon groups, e.g. vinyl groups, per molecule and a platinum catalyst into a desired form and contacting the shaped form with an organohydrogenpolysiloxane in a liquid form so that the latter siloxane diffuses through the shaped body and pertains to the crosslinking reaction with the unsaturated groups in the former siloxane as catalyzed by the platinum catalyst to give a cured silicone rubber body.

12 Claims, No Drawings

METHOD FOR THE PREPARATION OF A SHAPED ARTICLE OF CURED SILICONE RUBBER

BACKGROUND OF THE INVENTION

The present invention relates to a method for the preparation of a shaped article of cured silicone rubber. More particularly, the invention relates to a method for the preparation of a shaped article of a silicone rubber obtained of a so-called room temperature-vulcanizable (RTV) silicone rubber composition curable by the mechanism of the hydrosilation reaction between aliphatically unsaturated hydrocarbon groups in the organopolysiloxane and silicon-bonded hydrogen atoms catalyzed by a platinum catalyst.

Needless to say, silicone rubbers are materials having excellent properties in many respects including heat resistance, cold resistance, weathering resistance, electric properties and the like and used in a wide variety of industrial fields. Among them, there are known several classes of so-called room temperature-vulcanizable (RTV) silicone rubbers curable at room temperature by several different mechanisms for the crosslink formation including those curable by the condensation reaction in contact with the atmospheric moisture and those curable by the mechanism of the so-called hydrosilation reaction which is an addition reaction between aliphatically unsaturated hydrocarbon groups, e.g. vinyl, in the organopolysiloxane and the hydrogen atoms directly bonded to the silicon atoms. These RTV silicone rubbers are very useful in the building and construction works as a material for sealing or caulking applicable in the site of building or construction and as a electric insulating material in various kinds of electric and electronic instruments.

In contrast to the wide versatility of these RTV silicone rubber compositions, a problem in them is that the organopolysiloxane as the major constituent in these compositions is necessarily limited to those having a relatively low degree of polymerization in consideration of the requirements for the material such as good workability, long-term storability, high reactivity in curing, good miscibility between components and the like so that the shaped articles obtained by fully curing the RTV silicone rubber composition have only relatively low mechanical strengths in comparison with those of the silicone rubber articles curable only by heating. In addition, RTV silicone rubber compositions formulated with an organopolysiloxane of low molecular weight, as a matter of course, has a low consistency or is even flowable before curing so that once shaped forms of the compositions cannot retain the desired form. Even an improved RTV silicone rubber composition having a putty-like consistency cannot retain the once shaped form for a sufficiently long time before curing. In other words, sufficient form-retainability of the uncured silicone rubber composition and high mechanical strengths of the cured silicone rubber article can be obtained only with a silicone rubber composition having a millable consistency or a consistency suitable for roll-milling while no RTV silicone rubber composition having such a millable consistency is known.

Therefore, it may be a useful improvement if a means is provided for the preparation of a silicone rubber shaped article by curing at room temperature without the problems of the above mentioned poor retainability of the shaped form before curing and the relatively low mechanical strengths of the cured rubber articles.

SUMMARY OF THE INVENTION

An object of the present invention is therefore to provide a novel method for the preparation of a cured silicone rubber article with sufficiently high mechanical strengths in which an organopolysiloxane composition is shaped into a desired form and then cured at room temperature without suffering the problem of the deformation or even collapsing of the preshaped form before the curing reaction comes to completion.

Thus, the method of the present invention for the preparation of a cured silicone rubber article comprises (a) admixing an organopolysiloxane having at least two aliphatically unsaturated hydrocarbon groups, e.g. vinyl groups, per molecule and having a sufficiently high degree of polymerization with a catalytic amount of a platinum catalyst and, optionally, a filler to form an organopolysiloxane composition which is by itself not curable, (b) shaping the organopolysiloxane composition into the form of a desired article, and (c) bringing the shaped form of the organopolysiloxane composition into contact with a liquid organohydrogenpolysiloxane to effect diffusion thereof into the shaped form.

DETAILED DESCRIPTION OF THE PREFERRED EMBODIMENTS

As is mentioned above, the first step of the inventive method is the preparation of an organopolysiloxane composition which is not curable by itself comprising an organopolysiloxane having at least two aliphatically unsaturated hydrocarbon groups per molecule and having a sufficiently high degree of polymerization and a catalytic amount of a platinum catalyst.

The organopolysiloxane is a diorganopolysiloxane expressed by the average unit formula $R_aSiO_{(4-a)/2}$, in which R is a substituted or unsubstituted monovalent hydrocarbon group and a is a positive number in the range from 1.98 to 2.01. The group denoted by R is exemplified by alkyl groups such as methyl, ethyl, propyl and butyl groups, aryl groups such as phenyl and tolyl groups, aralkyl groups such as benzyl and phenylethyl groups and alkenyl groups such as vinyl, allyl, 3-methacryloxypropyl and cyclopenten-3-yl groups, as well as those substituted groups obtained by the substitution of halogen atoms, cyano groups and other substituents for part or all of the hydrogen atoms in the above named hydrocarbon groups.

It is essential that the organopolysiloxane has at least two aliphatically unsaturated hydrocarbon groups as named above or, preferably, vinyl groups, in a molecule in order to be crosslinkable in the inventive method and the molar content of such unsaturated groups should be in the range from 0.01 to 5% by moles or, preferably, from 0.1 to 2% by moles based on the total number of the groups denoted by the symbol R. This is because an organopolysiloxane having smaller than 0.01% by moles of the unsaturated hydrocarbon groups cannot be imparted with sufficient curability even in the curing according to the inventive method while an organopolysiloxane having a too much amount of the unsaturated hydrocarbon groups may lead to excessisve crosslink formation in the cured rubber which is rather brittle with low rubbery elasticity and poorly heat-resistant.

Another requirement for the organopolysiloxane is that the average degree of polymerization thereof should be sufficiently high in order that the uncured organopolysiloxane composition has a consistency capable of retaining the shaped form and the mechanical strengths after curing may be sufficiently high. Desirably, the average degree of polymerization of the organopolysiloxane should be at least 1000 or, preferably, at least 3000. That is, the organopolysiloxane which is a diorganopolysiloxane should be composed of at least 1000 or, preferably, at least 3000 diorganosiloxane units per molecule on an average. The chain-end groups of the linear molecules of the diorganopolysiloxane are not limited to a particular type including triorganosilyl groups and monohydroxy diorganosilyl groups although each of the chain-end groups is desirably a trihydrocarbylsilyl group in which one of the hydrocarbyl groups is a vinyl group.

The other essential component comprised in the organopolysiloxane composition prepared in the step (a) of the inventive method is a platinum catalyst which may be a known one used conventionally in the hydrosilation reaction by the mechanism of addition reaction between silicon-bonded alkenyl groups and silicon-bonded hydrogen atoms. Suitable forms of the platinum catalyst include solid elementary platinum such as platinum black and supported platinum catalysts on silica-gel, carbon and the like carrier and soluble platinum compounds and complexes such as platinum chloride, chloroplatinic acid and complexes thereof with alcohols and the like.

The amount of the platinum catalyst in the organopolysiloxane composition may be the so-called catalytic amount which is, in this case, in the range from 0.1 to 1000 p.p.m. or, preferably, from 1 to 200 p.p.m. by weight as platinum based on the organopolysiloxane above described.

The third component, though optional, used in the step (a) for the preparation of the organopolysiloxane composition is a filler, which may be a conventional one used in the formulation of silicone rubber compositions. Several of the examples are finely divided reinforcing silica fillers including silica hydrogels, e.g. hydrated silicic acid, silica aerogels, i.e. anhydrous silicic acid and fumed silica, fumed titanium dioxide, fumed alumina, carbon black and the like. These fillers should have a specific surface area of at least 50 m$^2$/g in order to exhibit good reinforcing effect. The addition of the filler to the organopolysiloxane composition is desirable from the standpoint of increasing the form-retainability of the organopolysiloxane composition before curing according to the inventive method and to improve the mechanical strengths of the silicone rubber obtained by the curing of the organopolysiloxane composition according to the inventive method. In this connection, the amount of the filler to be added to the organopolysiloxane composition should be in the range from 5 to 100 parts by weight per 100 parts by weight of the organopolysiloxane. When the amount of the filler is smaller than 5 parts by weight, no substantial effect of reinforcement can be obtained while an excessively large amount of the filler over 100 parts by weight causes extreme difficulties in blending thereof with the other components in the step (a) in addition to the unduly high hardness of the uncured composition with poor workability into forms and the poor mechanical strengths of the shaped silicone rubber articles obtained by curing the composition according to the inventive method.

The preparation of the organopolysiloxane composition in the step (a) of the inventive method is readily performed by uniformly blending the above mentioned organopolysiloxane, platinum catalyst and, optionally, filler in a suitable proportion above mentioned by use of a blending machine conventionally used in the technology of rubber processing such as a roller mill, kneader, Banbury mixer and the like. It is further optional that the organopolysiloxane composition is admixed with various kinds of known additives including non-reinforcing fillers such as quartz powder, alumina filler, clay, calcium carbonate, diatomaceous earth, titanium dioxide and the like, dispersion improvers such as low-molecular siloxane esters, silanols, e.g. diphenylsilane diol, and the like, heat-resistance improvers such as iron oxide, ceric oxide, iron octoate and the like and adhesion and/or workability improvers such as various types of so-called carbon-functional silanes and the like. The plasticity and green strength of the uncured form of the organopolysiloxane composition may be increased by incorporating finely divided powders of fluorocarbon polymers or boron, complexes of boron and an organopolysiloxane or several specific organic polymers according to need.

The organopolysiloxane composition, which is not curable by itself, prepared in the above described manner in the step (a) of the inventive method is then shaped into a desired form of, for example, sheets, tapes, tubes, rods or any other forms having an irregular cross section or configuration by a suitable known technique of molding such as compression, extrusion, calendering, coating and the like according to the particular object of the application of the inventive method. The organopolysiloxane composition can of course be applied directly to the place where it is to serve as a sealing or caulking material in the building or construction works. Owing to the sufficiently high consistency, the organopolysiloxane composition shaped into a desired form can retain the once shaped form without deformation for a time of any length.

The thus shaped form of the organopolysiloxane composition before curing is then brought into contact with a liquid organohydrogenpolysiloxane in the step (c) of the inventive method. This organohydrogenpolysiloxane should contain at least two hydrogen atoms directly bonded to the silicon atoms in a molecule introduced in the forms of siloxane or siloxy units represented by the general formulas of RHSiO, HSiO$_{1.5}$, R$_2$HSiO$_{0.5}$, H$_2$SiO, RH$_2$SiO$_{0.5}$ and the like, R being a substituted or unsubstituted monovalent hydrocarbon group as defined before, as combined, optionally, with other siloxane or siloxy units of the formulas RSiO$_{1.5}$, R$_2$SiO, R$_3$SiO$_{0.5}$, SiO$_2$ and the like bonded together in a suitable proportion in a random or block-wise manner to form a polymeric molecule. Several of the examples of such an organohydrogenpolysiloxane are shown by the following formulas, in which Me, Vi and Ph each denote a methyl, vinyl or phenyl group, respectively, and p, q, r and s are each a positive integer:

MeHSi(—O—SiMe$_2$H)$_2$; MeViSi(—O—SiMe$_2$H)$_2$;
MePhSi(—O—SiMe$_2$H)$_2$; Ph$_2$Si(—O—SiMe$_2$H)$_2$;
HSi(—O—SiMe$_2$H)$_3$; MeSi(—O—SiMe$_2$H)$_3$;
ViSi(—O—SiMe$_2$H)$_3$;
PhSi(—O—SiMe$_2$H)$_3$;
Me$_3$Si(O—SiMeH)$_p$(O—SiMe$_2$)$_q$O—SiMe$_3$;
Me$_2$HSi(O—SiMeH)$_r$(O—SiMe$_2$)$_s$O—SiHMe$_2$;

cyclic polymers of (MeHSi—O—)$_3$ and (MeHSi—O—)$_4$;
and a copolymer composed of dimethylhydrogensiloxy units Me$_2$HSiO$_{0.5}$ and tetrafunctional units SiO$_2$.

When the above named organohydrogenpolysiloxane is brought into contact with the shaped form of the uncured organopolysiloxane composition, the organohydrogenpolysiloxane is readily absorbed by and diffuses into the shaped form to pertain to the reaction of hydrosilation in situ, i.e. the addition reaction between the aliphatically unsaturated hydrocarbon groups in the organopolysiloxane and the silicon-bonded hydrogen atoms in the organohydrogenpolysiloxane, catalyzed by the platinum catalyst contained in advance in the shaped form of the composition. In this connection, it is a desirable condition that the organohydrogenpolysiloxane has a viscosity not so high as to exceed, for example, 1000 centistokes at 25° C. because an organohydrogenpolysiloxane having an excessively high viscosity is disadvantageous due to the decreased velocity of the absorption by and diffusion into the shaped form, especially, when the thickness of the shaped form in contact therewith is relatively large so that the curing of the shaped form of the organopolysiloxane composition would be incomplete, especially, in the depth of the form remote from the surface at which the organohydrogenpolysiloxane is contacted with the shaped form. The viscosity of the organohydrogenpolysiloxane is preferably 300 centistokes or below at 25° C.

The above described organohydrogenpolysiloxane is brought into contact with the surface of the shaped form of the organopolysioxane composition in several different way without any reason for limiting to a particular manner. For example, the simplest way of contacting them is the direct coating of the surface of the shaped form with the liquid organohydrogenpolysiloxane by dipping, brushing, spraying or any other suitable methods. It is of course that the shaped form is dipped and kept in the organohydrogenpolysiloxane for a sufficient length of time to complete the curing reaction. The time for contacting to cause sufficient curing in this method naturally depends on many factors and should be determined by a preliminary experiment although the time can be shortened by increasing the temperature. Alternatively, a porous body or an absorptive body such as woven and non-woven fabrics or foamed sponge-like bodies of polymers is soaked with the liquid organohydrogenpolysiloxane and the thus siloxane-impregnated body is brought into contact with the surface of the shaped form of the organopolysiloxane composition with or without contacting pressure. As a modification of such a procedure using a contacting body containing the liquid organohydrogenpolysiloxane, it is optional to use a body of a silicone rubber containing an organohydrogenpolysiloxane as the contacting body. Such a silicone rubber body containing an organohydrogenpolysiloxane can be prepared either by soaking or swelling a cured body of a silicone rubber with an organohydrogenpolysiloxane or by curing a silicone rubber composition admixed with a suitable amount of an organohydrogenpolysiloxane by a conventional molding and curing method. In this method of contacting a cured silicone rubber body impregnated with an organohydrogenpolysiloxane, strong adhesive bonding is obtained between the shaped form of the organopolysiloxane composition to be cured into a cured body according to the inventive method and the silicone rubber body impregnated with the organohydrogenpolysiloxane as the contacting body even to such an extent that no definite boundary is recognizable between two bodies after completion of the room temperature curing provided that the contacting time is sufficiently long, for example to exceed 24 hours. Therefore, this method provides a means for covering the surface of the silicone rubber shaped article cured by the inventive method with a silicone rubber body, e.g. sheet, cured in advance to impart a better appearance on the surface without any defects or pinholes which may adversely affect the reliability of the silicone rubber article.

In summary, the principle of the inventive curing method is that the organohydrogenpolysiloxane as the crosslinking agent is introduced into the pre-shaped form of the organopolysiloxane composition by diffusing migration penetrating the surface so that the degree of polymerization of the organopolysiloxane having aliphatically unsaturated hydrocarbon groups as the major component in the composition can be as high as desired without any limitation contributing to the improvement in the shape-retainability of the organopolysiloxane composition before curing and the mechanical strengths of the cured silicone rubber article according to the invention in addition to the advantage that the organopolysiloxane composition is free from the limitation in the storable life or pot life.

Following are the examples to illustrate the method of the invention in more detail. In the Examples, the "parts" always refers to "parts by weight" and the values of the viscosity of the materials were measured at 25° C.

EXAMPLE 1

An organopolysiloxane composition was prepared by admixing 100 parts of a methylvinylpolysiloxane having an average degree of polymerization of about 8000 and composed of 99.5% by moles of dimethylsiloxane units and 0.5% by moles of methylvinylsiloxane units as terminated at both molecular chain ends each with a dimethylvinylsilyl group with 40 parts of a fumed silica filler having a specific surface area of 200 m$^2$/g and 5 parts of diphenylsilane diol by kneading and the composition was, after aging for 2 hours at 150° C., further admixed with 14.5 p.p.m. by weight of chloroplatinic acid. This organopolysiloxane composition was molded into a sheet of 2 mm thickness. Several test pieces each 25 mm×50 mm wide were taken by cutting from the above prepared sheet of the composition and each of the test pieces was dipped at room temperature for 5 minutes in a methylhydrogenpolysiloxane (hereinafter referred to as H-siloxane 1) having a viscosity of 20 centistokes and expressed by the structural formula

Me$_3$SiO—SiHMe$_{730}$O—SiMe$_3$ and taken out thereof followed by standing at room temperature for a length of time up to 24 hours to periodically examine the condition of curing of the test piece on the surface and in the depths of 0.5 mm and 1.0 mm from the surface. The results were as shown in Table 1 below, in which the marks A, B and C indicate complete curing, partial or incomplete curing and almost uncured state, respectively.

TABLE 1

| Hours after taking out of H—siloxane | Curing on the surface | in the depth of 0.5 mm | 1.0 mm |
| --- | --- | --- | --- |
| 0 | A | C | C |
| 1 | A | B | C to B |
| 5 | A | B to A | B |
| 10 | A | A | B to A |
| 24 | A | A | A |

EXAMPLE 2

A cured silicone rubber sheet having dimensions of 25 mm×50 mm×2 mm was impregnated with 0.1 g of the same H-siloxane 1 as used in the preceding example by dipping therein and this cured rubber sheet was overlaid as a contacting body on the test piece prepared in the preceding example in direct contact therewith to be kept at room temperature. After 18 hours of contacting in this manner, it was found that curing of the test piece was complete and it was firmly bonded together to the rubber sheet of the contacting body.

EXAMPLE 3

The same test as in Example 2 was repeated with a cured silicone rubber sheet impregnated with 0.1040 g of the H-siloxane 1 by dipping therein as the contacting body and the same test piece prepared in Example 1. In this case, however, the test piece and the H-siloxane-impregnated cured sheet were periodically separated and the weight increase in time of the test piece was measured to give the results shown in Table 2 together with the state of curing of the test piece on the surface opposite to the surface contacted with the H-siloxane-impregnated rubber sheet indicating migration of the H-siloxane into the test piece. The marks A, B and C in Table 2 for the state of curing have the same meaning as in Table 1.

Similarly, another test was undertaken with the cured silicone rubber sheet of the same dimensions impregnated with 0.1805 g of a methylhydrogenpolysiloxane (hereinafter referred to as H-sioxane 2) having a viscosity of 100 centistokes and composed of $Me_2HSiO_{0.5}$ units and $SiO_2$ units in a molar ratio of 2:1. The results were as shown in Table 2.

TABLE 2

| | H—siloxane 1 | | | H—siloxane 2 | | |
| --- | --- | --- | --- | --- | --- | --- |
| Time of contacting, hours | Weight of test piece, g | Weight increase in test piece, g | State of curing | Weight of test piece, g | Weight increase in test piece, g | State of curing |
| 0 | 2.9747 | — | — | 2.9836 | — | — |
| 1 | 2.9904 | 0.0157 | C | 3.0089 | 0.0257 | C |
| 2 | 2.9940 | 0.0193 | C | 3.0097 | 0.0261 | C to B |
| 4 | 3.0007 | 0.0260 | C to B | 3.0138 | 0.0302 | B |
| 6 | 3.0045 | 0.0298 | B | 3.0154 | 0.0318 | B to A |
| 20 | 3.0087 | 0.0340 | A | 3.0240 | 0.0404 | A |

EXAMPLE 4

An organopolysiloxane composition was prepared by admixing a mixture, which was prepared by mixing 100 parts of a methylvinylpolysiloxane having an average degree of polymerization of about 8000 and composed of 99.7% by moles of dimethylsiloxane units and 0.3% by moles of methylvinylsiloxane units as terminated at both molecular chain ends each with a dimethylvinylsilyl group, 50 parts of a fumed silica filler having a specific surface area of 200 m²/g and blocked with trimethylsilyl groups on the surface, 1 part of a dimethylpolysiloxane having a viscosity of 20 centistokes and terminated at both molecular chain ends each with a dimethylhydroxysilyl group and 0.5 part of diphenylsilane diol followed by aging at 150° C. for 2 hours, with 20 p.p.m. by weight of chloroplatinic acid. Another organopolysiloxane composition was prepared in the same formulation as above except that the chloroplatinic acid was replaced with 2,4-dichlorobenzoyl peroxide in an amount of 0.8% by weight based on the total amount of the other components.

Each of the above prepared organopolysiloxane compositions were shaped into a tape of 0.5 mm×20 mm cross section by use of an extruder machine and the tape of the peroxide-containing composition was cured by heating at 400° C. for 15 seconds followed by post curing at 200° C. for 1 hour. The thus peroxide-cured silicone rubber tape was dipped in a methylhydrogenpolysiloxane fluid (hereinafter referred to as H-siloxane 3) having a viscosity of 10 centistokes and expressed by the formula

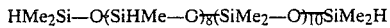

for 10 minutes to show 3.7% of weight increase by the absorption of and swelling with this H-siloxane 3.

The two tapes above were laid one on the other to be in direct contact and wound together tightly around a pipe having an outer diameter of 1 inch with the platinum-containing uncured tape facing inside to be kept standing at room temperature. After 24 hours of standing in this manner, the platinum-containing tape was found to have been completely cured and the adhesion between tapes was very firm to such an extent that the interface therebetween indicated no clear visibility to provide a satisfactory covering layer to the pipe.

Meanwhile, the tapes overlaid one on the other was kept as such at room temperature for 24 hours without being wound around the pipe. It was found that the tape of the platinum-containing composition had been fully cured and integrated with the peroxide-cured tape to show no clear interface therebetween. The mechanical properties of the thus integrated tape were: hardness (JIS) 50; ultimate elongation at break 530%; tensile strength 95 kg/cm²; and tear strength 31 kg/cm.

EXAMPLE 5

The organopolysiloxane composition containing chloroplatinic acid as prepared in the preceding example was shaped into a sheet of 1 mm thickness and coated with the H-siloxane 2 (see Example 3) by brushing. After keeping as wet with the H-siloxane 2 at room temperature for 10 hours, the sheet was found to have been fully cured into a cured silicone rubber sheet having mechanical properties shown in Table 3 below.

For comparison, a commercially available RTV silicone rubber composition having a putty-like consistency (KE 1205, a product by Shin-Etsu Chemical Co.) was uniformly admixed with 10% by weight of a platinum-based catalyst (C-1205, a product by the same company supra) and shaped into a sheet of 1 mm thickness. This sheet was also cured by keeping at room temperature for 48 hours into a cured silicone rubber sheet having mechanical properties shown in Table 3.

TABLE 3

| Property | Silicone rubber sheet | |
| --- | --- | --- |
|  | Cured sheet according to the invention | Cured sheet of KE 1205 |
| Hardness (JIS) | 48 | 36 |
| Ultimate elongation, % | 490 | 370 |
| Tensile strength, kg/cm$^2$ | 89 | 28 |
| Tear strength, kg/cm | 35 | 8 |

What is claimed is:

1. A method for the preparation of a cured silicone rubber article which comprises the steps of:
   (a) admixing an organopolysiloxane having at least two aliphatically unsaturated hydrocarbon groups per molecule and having a sufficiently high degree of polymerization with a catalytic amount of a platinum catalyst to form an organopolysiloxane composition which is by itself not curable,
   (b) shaping the organopolysiloxane composition into the form of a desired article, and
   (c) bringing the shaped form of the organopolysiloxane composition into contact with a liquid organohydrogenpolysiloxane to effect diffusion thereof into the shaped form.

2. The method as claimed in claim 1 wherein the organopolysiloxane is a diorganopolysiloxane having a substantially linear molecular structure with an average degree of polymerization of at least 1000.

3. The method as claimed in claim 1 wherein the aliphatically unsaturated hydrocarbon group is a vinyl group.

4. The method as claimed in claim 1 wherein the organopolysiloxane composition further contains from 5 to 100 parts by weight of a finely divided filler having a specific surface area of at least 50 m$^2$/g per 100 parts by weight of the organopolysiloxane.

5. The method as claimed in claim 1 wherein the organohydrogenpolysiloxane has a viscosity not exceeding 1000 centistokes at 25° C.

6. The method as claimed in claim 1 wherein the shaped form of the organopolysiloxane composition is brought into contact with the organohydrogenpolysiloxane by coating therewith.

7. The method as claimed in claim 1 wherein the shaped body of the organopolysiloxane composition is brought into contact with the organohydrogenpolysiloxane by contacting with a contacting body impregnated with the organohydrogenpolysiloxane.

8. The method as claimed in claim 7 wherein the contacting body is a cured silicone rubber body impregnated with the organohydrogenpolysiloxane.

9. The method as claimed in claim 8 wherein the cured silicone rubber body impregnated with the organohydrogenpolysiloxane is a cured silicone rubber body swollen with the organohydrogenpolysiloxane.

10. The method as claimed in claim 8 wherein the cured silicone rubber body impregnated with the organohydrogenpolysiloxane is prepared by curing a silicone rubber composition containing the organohydrogenpolysiloxane.

11. The method as claimed in claim 1 wherein the organopolysiloxane has the aliphatically unsaturated hydrocarbon groups in an amount of from 0.01 to 5% by moles based on the total amount of the organic groups therein.

12. The method as claimed in claim 1 wherein the organohydrogenpolysiloxane has at least two hydrogen atoms directy bonded to the silicon atoms therein.

* * * * *